No. 611,034. Patented Sept. 20, 1898.
M. GOMEZ.
CANE PLANTER.
(Application filed May 13, 1898.)
(No Model.) 2 Sheets—Sheet 1.
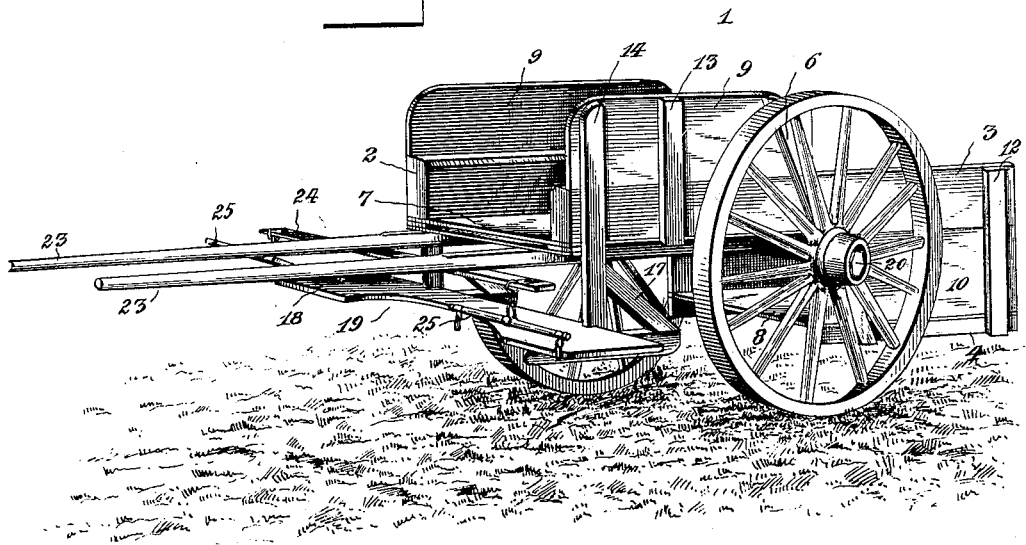
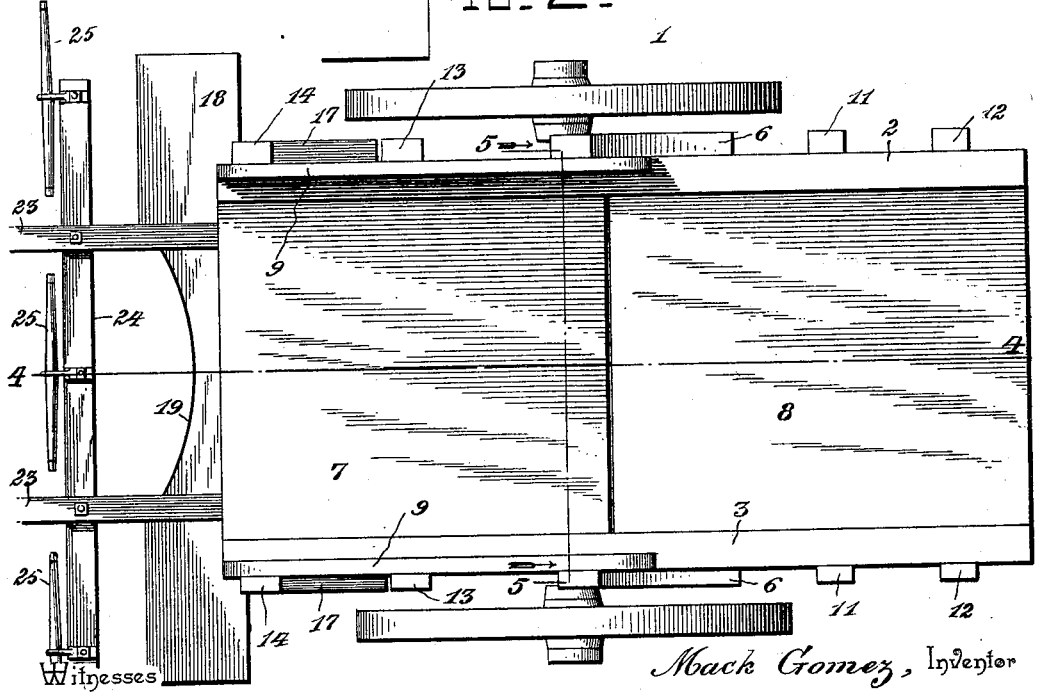
Mack Gomez, Inventor No. 611,034. Patented Sept. 20, 1898.
M. GOMEZ.
CANE PLANTER.
(Application filed May 13, 1898.)
(No Model.) 2 Sheets—Sheet 2.
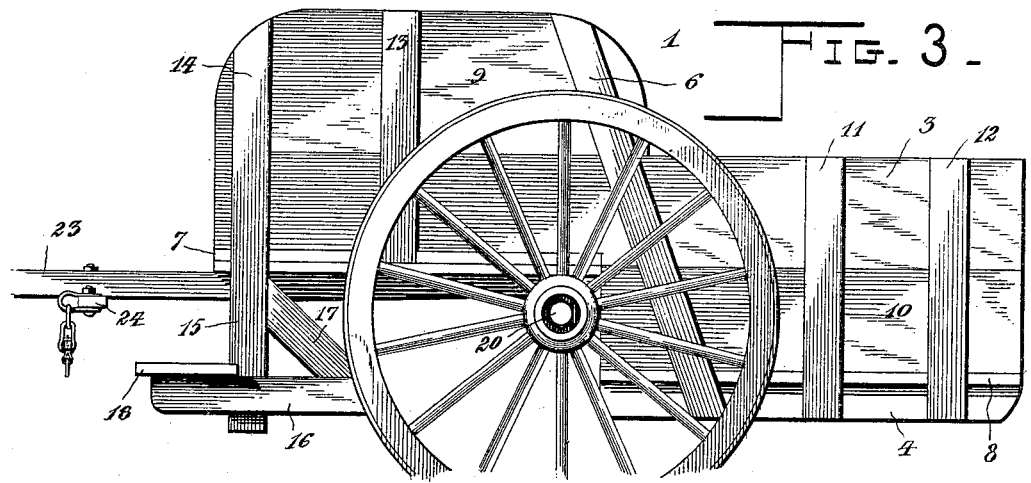
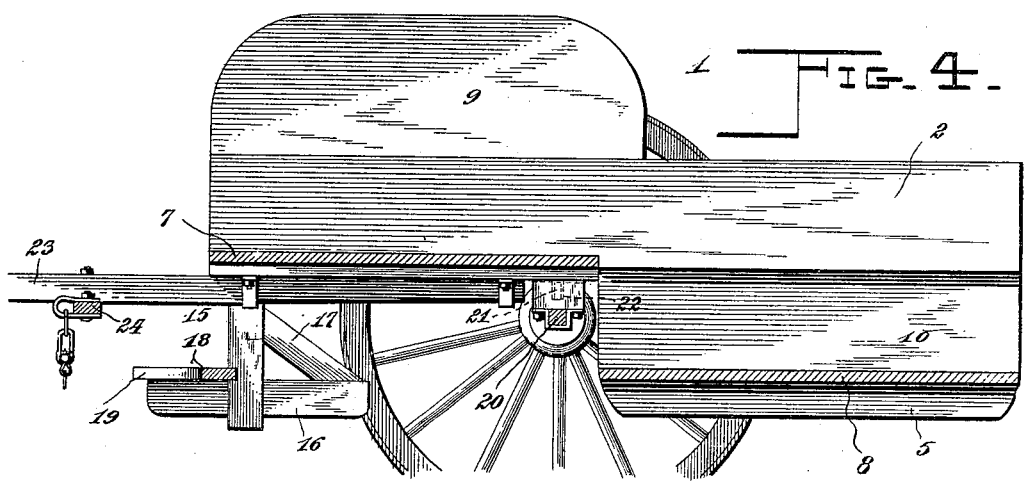
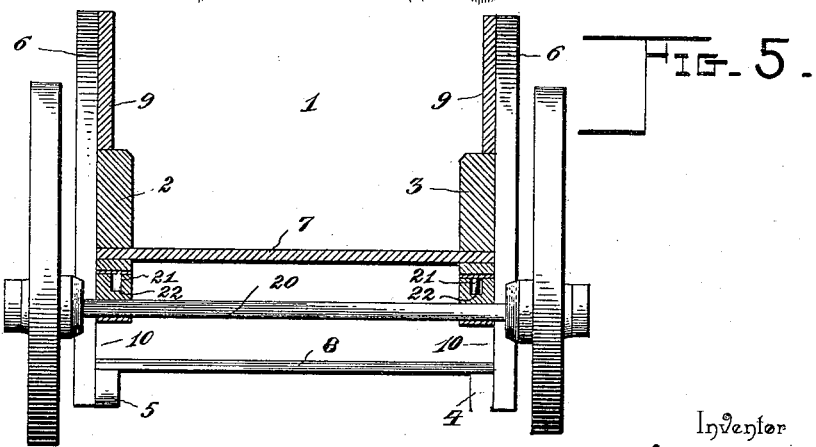
Witnesses Inventor
Mack Gomez,
By his Attorneys,

UNITED STATES PATENT OFFICE.

MACK GOMEZ, OF PLAQUEMINE, LOUISIANA.

CANE-PLANTER.

SPECIFICATION forming part of Letters Patent No. 611,034, dated September 20, 1898.

Application filed May 13, 1898. Serial No. 680,596. (No model.)

*To all whom it may concern:*

Be it known that I, MACK GOMEZ, a citizen of the United States, residing at Plaquemine, in the parish of Iberville and State of Louisiana, have invented a new and useful Cane-Planter, of which the following is a specification.

My invention relates to a means for planting sugar-cane; and the object that I have in view is to provide a simple, strong, and durable structure adapted to carry a large quantity of cane and arranged to permit the machine to be used by operators near each end thereof for the purpose of planting cane in three furrows at one trip across the field, thereby enabling a large amount of work to be performed by a small number of operators to facilitate the labor and reduce the cost of planting cane.

A further object of the invention is to provide an improved structure adapted to be readily applied to an ordinary running-gear and to balance or poise itself thereon; and a further object is to provide means by which the operators at one end of the structure may ride thereon while engaged in the labor of planting cane from one end of the machine.

With these ends in view the invention consists in the novel construction and arrangement of parts, which will be hereinafter fully described and claimed.

To enable others to understand the invention, I have illustrated the same in the accompanying drawings, forming a part of this specification, and in which—

Figure 1 is a perspective view of a cane-planter constructed in accordance with my invention. Fig. 2 is a top plan view thereof. Fig. 3 is a side elevation. Fig. 4 is a longitudinal sectional view on the plane indicated by the dotted line 4 4 of Fig. 2. Fig. 5 is a transverse sectional view on the plane indicated by the dotted line 5 5 of Fig. 2, looking in the direction of the arrow.

Like numerals of reference denote like and corresponding parts in each of the several figures of the drawings.

The cane-planter of my invention is designated in its entirety by the numeral 1, and it consists of a structure which is open at both ends and equipped with load-carrying platforms which are arranged in different horizontal planes to enable operators stationed at the respective ends of the open structure to readily extract the pieces of sugar-cane therefrom preliminary to depositing the same in a series of furrows, preferably three in number, at each trip of the machine across the field. The structure consists of the longitudinal sills 2 and 3, which extend from front to rear of the body on opposite sides thereof, a pair of horizontal lower sills 4 and 5, arranged beneath the sills 2 and 3, the inclined uprights 6, the load-platforms 7 and 8, and the side walls 9 and 10 on the front and rear sections or members of the structure. The platforms 7 and 8 are arranged in different horizontal planes at the front and rear ends of the body, and they are rigidly secured to the upper sills 2 3 and the lower sills 4 and 5. The upper platform 7 at the front end of the machine is secured to the lower edges of the longitudinal sills 2 3 in any approved manner, and these sills extend over the lower rear sills 4 5 to the open rear end of the body. The inclined uprights 6 are secured rigidly to the lower sills 4 5, and they extend across the upper longitudinal sills 2 3, above which the uprights 6 project a suitable distance, whereby the uprights firmly join the sills together. The sides 9 are fitted upon the side sills 2 and 3, and they are secured to the uprights 6 and to the posts 13 and 14. The sides 10 for the section at the rear of the structure are arranged between the lower platform 8 and the sills 2 3, and said sides 10 are rigidly secured to the uprights 6 and to the posts 11 12.

From the foregoing description it will be understood that I provide a structure in which two load-carrying platforms are arranged in different horizontal planes at opposite ends of an open body and that the sides of the body are closed by the walls 9 and 10 in connection with the wide sills 2 and 3, the latter thus forming parts of the side walls for the front and rear sections of the structure.

The posts 14 at the front end of the upper section with which the platform 7 is associated are extended below the platform 7, and said posts carry the standing-board sills 16, which are securely attached to the extended ends 15 of the posts 14. These short sills 16 are at right angles to the posts 14, to which said sills are rigidly secured, and at the rear ends of the sill 16 they are braced by the inclined struts 17, suitably bolted to the sills and the posts.

18 designates the standing-board, which is arranged in a horizontal position across the front end of the structure or body and at a suitable distance below the platform 7, parallel therewith. This standing-board rests upon the projecting front ends of the sills 16, to which the platform is rigidly secured in a suitable way, and at its middle this standing-board is provided with a curved recess 19 in the front edge thereof, said recess being designed to permit the central draft-animal to back with the vehicle without coming in contact with the standing-board.

My improved structure is adapted to be fitted upon the axle 20 of an ordinary running-gear in a manner to permit the structure to balance or poise itself on the axle, owing to the distribution of the load upon the platforms 7 and 8. The axle 20 is placed beneath the platform 7, at the inner end thereof and adjacent to the corresponding end of the lower platform, so that the structure is fitted at its middle upon the axle, and said structure is rigidly attached to the axle by means of the vertical bolts or pins 21, which are rigidly fastened in the platform 7 and the sills 2 3, so as to depend a suitable distance below the platform 7 and enter openings or sockets 22, which are provided in the axle 20, as represented by Figs. 4 and 5 of the drawings.

My planter is designed to be drawn by three draft-animals, and to this end I employ a pair of thills 23, which are attached to the axle 20, and a doubletree 24, which extends across the thills and carries the singletrees 25.

In using my improved planter the three draft-animals are hitched to the singletrees and the body is loaded by piling cane upon the platforms. When the machine is driven across the field, two operators stand upon the board 18 at the sides of the machine for the purpose of planting the cane in the side furrows, while a third operator walks in rear of the machine to deposit the cane in the middle furrow. The operators stationed on the standing-board 18 at the front end of the machine are convenient to the platform 7 for taking the cane therefrom and depositing the same in the side furrows, while the rear lower platform 8 is convenient to the operator who walks in rear of machine to plant the cane in the middle furrow.

My improved machine is extremely simple and durable in construction and its parts are arranged to permit the cane to be extracted therefrom by operators who are able to plant the cane in three furrows at each trip of the machine across the field. The employment of a cane-planter constructed in accordance with my invention enables a small number of operators to perform a large amount of work each day, and thus economy in time and labor may be effected.

It is evident that changes in the form and proportion of parts may be made by a skilled mechanic without departing from the spirit or sacrificing the advantages of the invention.

Having thus described the invention, what I claim is—

1. A cane-planter comprising the longitudinal sills, 2, 3, a platform, 7, secured thereto, the lower sills, 4, 5, arranged beneath the longitudinal sills at the rear end of the body, the inclined uprights joined rigidly to said sills, the lower platform secured to the sills, 4, 5, a standing-board secured to extensions from the platform, 7, and the side boards secured to posts which are fastened to the sills, substantially as described.

2. A sugar-cane planter comprising a body having its longitudinal sills arranged to form the support for the load-platforms which are arranged in different horizontal and vertical planes, a single transverse axle secured detachably to the sills of the body in a plane between the adjacent ends of the load-platforms for the body to balance itself on said axle, the front posts secured to the sills and the sides of the front compartment of which the highest platform forms a part, the short sills secured to the posts beneath the elevated platform, and a standing-board secured to the short sills at the front end of the body and below the elevated load-platform thereof, substantially as described.

In testimony that I claim the foregoing as my own I have hereto affixed my signature in the presence of two witnesses.

MACK $\overset{\text{his}}{\times}$ GOMEZ.
mark

Witnesses:
   J. L. DUFFEL,
   JAS. M. RHORER, Jr.